Figures 1, 2:
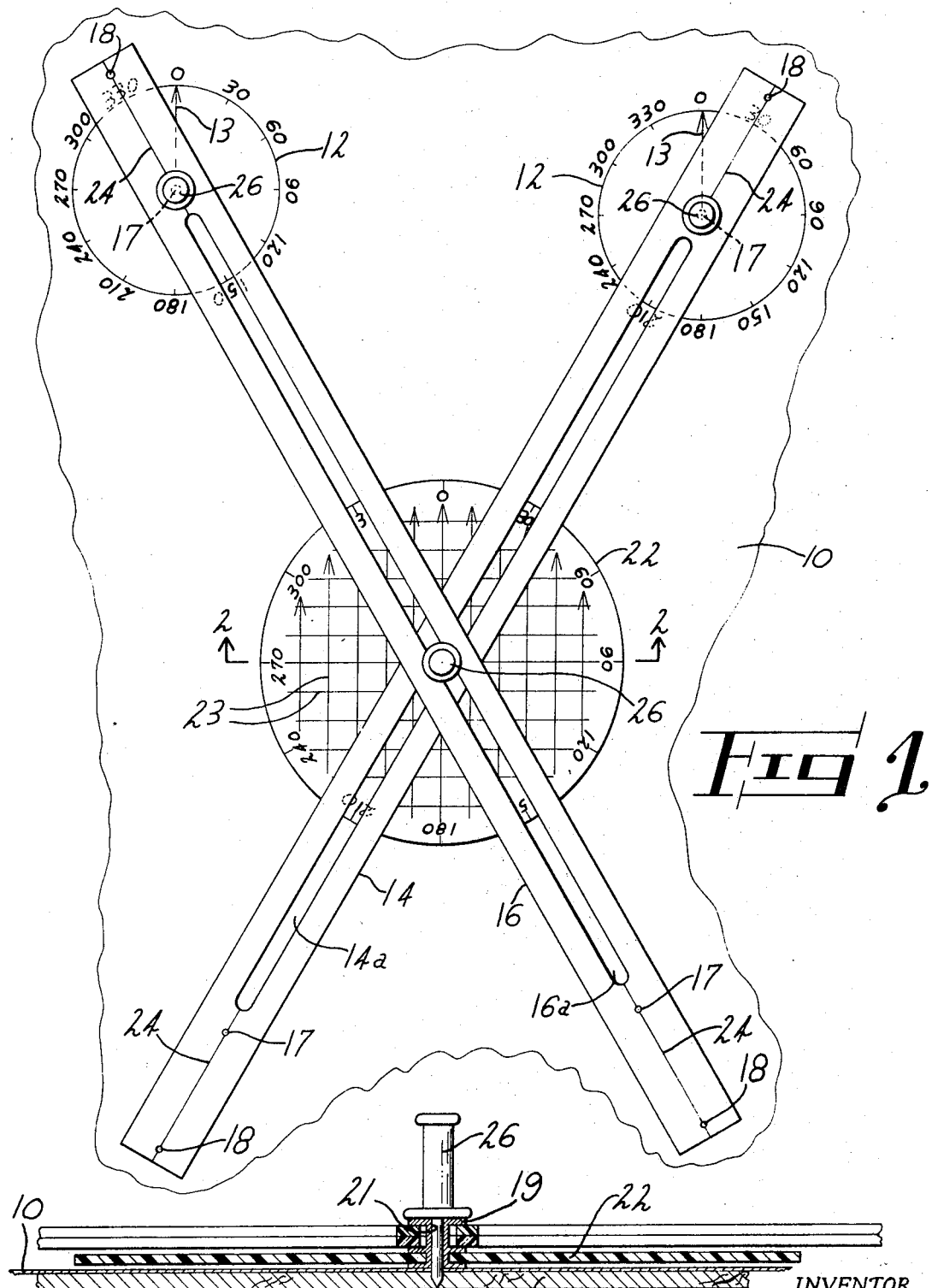

United States Patent
Henley, III

[15] 3,690,009
[45] Sept. 12, 1972

[54] POSITION LOCATOR

[72] Inventor: John C. Henley, III, 2345 Crest Rd, Birmingham, Ala. 35223

[22] Filed: June 8, 1970

[21] Appl. No.: 44,181

[52] U.S. Cl. ............................33/1 MP, 33/76 VA, 33/98
[51] Int. Cl. ................................................B43l 7/00
[58] Field of Search..................33/98, 1 MP, 76 R, 76 VA, 1 SD

[56] References Cited

UNITED STATES PATENTS

| | | | |
|---|---|---|---|
| 997,826 | 7/1911 | Jones | 33/98 |
| 3,187,434 | 6/1965 | Casagrande | 33/1 MP |
| 2,505,149 | 4/1950 | Schoenberg | 33/98 |
| 3,387,372 | 6/1968 | Sabadishin | 33/1 MP X |

FOREIGN PATENTS OR APPLICATIONS

| | | | |
|---|---|---|---|
| 135,646 | 12/1919 | Great Britain | 33/76 VA |
| 344,256 | 11/1921 | Germany | 33/1 MP |

*Primary Examiner*—William D. Martin, Jr.
*Attorney*—Jennings, Carter & Thompson

[57] ABSTRACT

A simple and inexpensive position locator especially adapted for use by aviators in determining their location from two known fixes such as a pair of omni range navigation stations. The device includes a pair of pivoted and slotted straight edges with locator holes adjacent at least one end of each straight edge and a pin hole through the pivotal connection. Given the radials from two such stations shown on a chart, the locator holes are centered over the stations and the straight edges are extended along the radials, whereupon the position of the aircraft is coincident with the pin hole in the pivot member.

1 Claim, 2 Drawing Figures

INVENTOR.
John C. Henley III
BY
Jennings Carter & Thompson
Attorneys

POSITION LOCATOR

My invention relates to position indicators particularly adapted for use by aviators for locating their positions on a map or chart, knowing for such purpose the radials from at least two radio stations.

An object of my invention is to provide a simple and inexpensive, readily usable position locator which comprises a pair of slotted and pivoted straight edges, there being locator holes positioned adjacent the ends of the straight edges and transversely centered therein, the two straight edges being slidably and pivotally secured together by a connector member which has a pin hole through it, whereby the position relative to two omni stations, or similar radio navigation fixes, may be obtained by centering the locator holes over the centers of the stations, and then extending the straight edges in line with the known radials on which the aircraft is located, whereupon the position of the aircraft is indicated directly beneath the pin hole in the connecting member.

A further object of my invention is to provide a position indicator of the character designated in which the locations of the indicator holes are such that when reading a radial from a station the bearing to the station may also be read, this being due to the provision of a line or mark which extends from one of the indicator holes outwardly, past the compass rose which is usually used to indicate an omni range navigation station.

My invention contemplates making the straight edges of transparent material such as one of the commonly used plastics and further to associate with the pivotal connection a transparent, 360° protractor, whereby through the use of my device both true and magnetic directions may be determined and providing means for visually noting the extent of magnetic variation.

Apparatus illustrating features of my invention is shown in the accompanying drawing in which:

FIG. 1 is a plan view, showing my improved device in position on a fragment of a chart which shows a pair of omni range navigation station compass roses; and, FIG. 2 is an enlarged detail fragmental view taken generally along line 2-2 of FIG. 1.

Referring now to the drawings for a better understanding of my invention I prefer to use the same by placing it on the face of a chart, map, or the like indicated at 10 and which may be supported on a relatively heavy backing member 11. By way of example, it is customary, for use in aerial radio navigation to employ charts 10 which show the precise location of omni range stations, and these have superimposed concentrically thereabout enlarged compass roses indicated at 12. Also as well known these compass roses are laid out with their north lines 13 oriented to magnetic north as distinguished from true north. In the use of such charts for aerial navigation purposes the aircraft is equipped with a radio receiver, capable of receiving signals from the stations, together with means to determine precisely from such signals which radial the aircraft is on relative to the station.

My improved device comprises a pair of straight edges 14 and 16. As indicated, the straight edges are provided with slots 14a and 16a, extending for the major portion of the length of each straight edge and transversely centered relative to the width of each straight edge. Adjacent the ends of the straight edges are locator holes 17, these holes being located precisely on the center lines of the straight edges. Also, for a purpose later to appear, further toward the ends of each of the straight edges are additional holes 18 which, like the holes 17, are only large enough to receive the shank of a pin which may be stuck through the chart and into the baseboard 11.

The two straight edges are slidably and pivotally connected by means of a grommet type connecting member 19, which member has a pin hole 21 through its center. Also rotatably carried by the member 19 and also rotatable relative to the straight edges is a 360° protractor 22. The protractor 22 may have lines 23 thereon, thus to facilitate aligning the same with the true north grid lines which appear on the usual chart 10, which grid lines are not shown.

It will also be noted that I provide a line 24 adjacent the ends of the straight edges, between holes 17 and 18.

From the foregoing the method of using my improved device and its several advantages may be more fully explained. Let it be supposed, for instance, that with the chart 10 pinned or otherwise secured to the base 11, the airplane is being operated generally in a position south of the radio stations indicated by the compass roses 12. The user of the device will first place pins 26 through the holes 17, centering them precisely at each of the stations involved. Then, through the use of his radio and allied equipment, he determines his position to be on the 210° radial of one of the stations and on the 150° radial of the other station. He then brings the centers of the straight edges over the 210° and 150° figures of the respective compass roses, whereupon by inserting a pin 26 through opening 21 in member 19 his position on the chart will be indicated by the pin prick in the paper. It will be noted that the lines 24 read precisely the reciprocal of the respective radials from the stations, that is, 30° for the station at the right of FIG. 1 and 330° for the station to the left in FIG. 1.

As stated, these radio facilities are oriented to magnetic north. Therefore, if the user wishes to determine true north all he has to do is to set the parallel "north south" lines 23 of the rotatable protractor parallel with the grid lines on the map. True readings corresponding to the magnetic readings appear between the slots on the edge of the protractor.

Once the position is determined and a pin 26 put in place through member 19, the pin 26 from either of the other straight edges may be removed whereupon through the use of appropriate scales, not shown, which may be placed on the straight edges, distance to a destination point, or to any other position on the chart may be read directly. Of course, the scales could be laid out in statute or nautical miles, or both, as desired. Likewise, if a direction from the fix point to another point on the chart is desired, this may be determined simply by aligning one of the straight edges between the fix point and the desired point.

While I have described my improved apparatus as being particularly useful for aerial navigation, it will be seen that the same may have utility for other position location problems, such as artillery fire control, navigation at sea, and so forth. In any event, my invention is extremely simple, practical and quite easy to use. It is particularly useful for training aviators and is compact enough to be used on a lap board when using either the so called "sectional" or "world aeronautical" charts both of which are printed by the federal government and widely available to the flying public. My invention can be used to provide a continuing pictorial display of the aircraft's position and track, thus increasing the safety of flight and facilitating the immediate initiation of emergency procedures, if necessary. For example, the pilot has before him information from which he visually determines factors such as wind drift, ground speed, the location and direction to the closest landing area, proximity to prohibited or restricted areas, and the many other advantages of always knowing one's location. Furthermore, my invention puts within reach of even the novice pilot the capability of fully using the large scale Federal air navigation system.

While I have shown my invention in but one form, it will be obvious to those skilled in the art that it is not so limited, but is susceptible of various other changes and modifications without departing from the spirit thereof.

What I claim is:

1. In a position locator,
   a. at least a pair of straight edges,
   b. locator holes near the ends of the straight edges disposed to be placed over a pair of known locations on a chart or the like, said holes being located on the longitudinal axes of the straight edges,
   c. said locator holes being located far enough from the ends of the straight edges for the straight edges to extend past a normal sized compass rose printed on a chart or the like,
   d. there being reference marks extending from said holes outwardly toward the ends of the straight edges along the longitudinal axes thereof, whereby the reciprocal of a radial from a compass rose may be read directly,
   e. each straight edge having a slot extending through the major portion of its length and transversely centered relative to the longitudinal center line of the straight edge,
   f. a member located in said slots and relative to which intersection straight edges are independently relatively rotatable and slidable, there being a hole through the said member located at the intersection of the longitudinal axes of said straight edges, whereby with the holes adjacent the ends of the straight edges centered over said known locations and with the straight edges extending therefrom in known directions, the then position of the observer is indicated beneath the hole through said member.

* * * * *